UNITED STATES PATENT OFFICE.

PAUL R. HERSHMAN, OF CHICAGO, ILLINOIS.

PROCESS OF MAKING ALUMINATES FROM RAW ALUNITE.

1,191,106.  Specification of Letters Patent.  Patented July 11, 1916.

No Drawing.  Application filed February 1, 1916. Serial No. 75,492.

*To all whom it may concern:*

Be it known that I, PAUL R. HERSHMAN, a citizen of the Empire of Austria-Hungary, residing in the city of Chicago, county of Cook, State of Illinois, have invented certain new and useful Improvements in Processes of Making Aluminates from Raw Alunite; and I do hereby declare the following to be a full, clear, and exact description of the invention, such as will enable others skilled in the art to which it appertains to make and use the same.

In my prior applications Serial Nos. 72,689 and 72,690, filed January 18, 1916, I have described the formation of aluminates from alunite and the rendering soluble of the surplus of alumina contained therein, by means of roasting operations.

The present invention relates to the treatment of alunite, and the recovery of alumina and potash therefrom, by a wet method, which comprises boiling the alunite with water and with certain compounds which form water insoluble sulfates with sulfuric acid anhydrid, and which at the same time convert the alumina into water soluble compounds. The compounds which are used for this purpose are the water soluble compounds of the alkaline earth metals which form insoluble sulfates, and particularly the basic compounds such as the oxids and hydroxids, these compounds being used in amounts sufficient to combine with all of the sulfuric acid content of the alunite, so that all of this acid radical will be present at the end of the operation in the form of insoluble alkaline earth metal sulfates, and so that the remaining products will be free from sulfuric acid.

Among the compounds of the alkaline earth metals, those of barium, for example barium oxid or hydroxid, are of particular importance for the reason that, in addition to forming insoluble sulfates with the sulfuric acid anhydrid of the alunite, they form a water soluble aluminate.

The invention will be further illustrated by the following specific example: 100 parts of raw alunite are boiled for about one hour at a temperature corresponding to a pressure of about 50 pounds per square inch, with 125 parts of barium oxid and 500 parts of water. The solution is allowed to settle, and the clear liquor drawn off while still very hot. The residue consists principally of barium sulfate with the impurities, such as barium silicate, silica, iron compounds, etc., while the solution contains a mixture of almost pure aluminates, principally barium and potassium aluminates, with a small percentage of sodium aluminate. The solution which is strongly alkaline, is then neutralized with hydrochloric acid, whereby pure alumina is precipitated and barium and potassium chlorids, and a small amount of sodium chlorid, formed. These chlorids, being soluble, stay in solution. The precipitated alumina is filtered off and can be washed free from impurities, or otherwise treated. The solution, containing the chlorids, is treated with carbonic acid to precipitate barium carbonate, which is filtered off. The solution is then evaporated for the recovery of the potassium salt.

The barium carbonate can be reconverted into hydroxid by "steaming", and most of the barium which has been converted into sulfate can also be recovered by boiling with soluble carbonate, and subsequent "steaming" and leaching of the barium carbonate obtained.

It will be understood that the method specifically described above can be subjected to many variations without departing from the spirit of my invention. Thus, instead of neutralizing with hydrochloric acid, carbonic acid can be used, and the aluminum oxid thus precipitated, together with the barium carbonate, leached out with sodium lyes, etc. So also, instead of using the barium hydroxid or other alkaline earth metal compound alone, other reagents can be present which do not prejudice the reaction or interfere with proper recovery of the desired materials.

I claim:

1. The method of treating alunite and of recovering alumina and potash therefrom substantially free from sulfuric acid, which comprises boiling the alunite with a water soluble compound of an alkaline earth metal forming an insoluble sulfate.

2. The method of treating alunite and of recovering alumina and potash therefrom substantially free from sulfuric acid, which comprises boiling the alunite under pressure with a water soluble compound of an alkaline earth metal forming an insoluble sulfate.

3. The method of treating alunite and of recovering alumina and potash therefrom substantially free from sulfuric acid, which comprises boiling the alunite with a water soluble compound of barium.

4. The method of treating alunite and of recovering barium and potassium aluminates therefrom substantially free from sulfuric acid, which comprises boiling the alunite under pressure with barium hydroxid.

5. The method of treating alunite and of recovering alumina and potash therefrom substantially free from sulfuric acid, which comprises boiling the alunite with barium hydroxid and thereby producing barium sulfate and a solution of potassium and barium aluminates, neutralizing the resulting solution with an acid and thereby precipitating alumina and forming the barium salt of the acid, and recovering barium hydroxid from said barium salt and from the barium sulfate, for reuse.

In testimony whereof I affix my signature.

PAUL R. HERSHMAN.